US006923005B2

(12) United States Patent
Casoni

(10) Patent No.: US 6,923,005 B2
(45) Date of Patent: Aug. 2, 2005

(54) SYSTEM TO FEED COOLING AIR INTO A GAS TURBINE ROTOR

(75) Inventor: Andrea Casoni, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 25 days.

(21) Appl. No.: 10/450,263

(22) PCT Filed: Dec. 5, 2001

(86) PCT No.: PCT/EP01/14709

§ 371 (c)(1), (2), (4) Date: Jun. 12, 2003

(87) PCT Pub. No.: WO02/48525

PCT Pub. Date: Jun. 20, 2002

(65) Prior Publication Data

US 2004/0013516 A1 Jan. 22, 2004

(30) Foreign Application Priority Data

Dec. 15, 2000 (IT) .................................... MI2000A2719

(51) Int. Cl.[7] .............................. F02C 7/18; F01D 5/18

(52) U.S. Cl. ........................... 60/785; 60/806; 415/115; 415/174.5

(58) Field of Search .................. 60/785, 806; 415/115, 415/144, 174.4, 174.5

(56) References Cited

U.S. PATENT DOCUMENTS

| | | | | | |
|---|---|---|---|---|---|
| 4,296,599 | A | * | 10/1981 | Adamson | 60/806 |
| 4,416,111 | A | | 11/1983 | Lenahan et al. | |
| 4,541,774 | A | | 9/1985 | Rieck et al. | |
| 4,674,955 | A | * | 6/1987 | Howe et al. | 415/115 |
| 5,555,721 | A | | 9/1996 | Bourneuf et al. | |
| 5,586,860 | A | | 12/1996 | Bertrand et al. | |
| 6,540,477 | B2 | * | 4/2003 | Glynn et al. | 415/115 |

* cited by examiner

*Primary Examiner*—Ted Kim
(74) *Attorney, Agent, or Firm*—Nixon & Vanderhye

(57) ABSTRACT

A system to feed cooling air to a gas turbine, wherein the cooling air is taken from a high-pressure source, inside the gas turgine, and is conveyed to radial accelerators (129, which give rise to the tangential acceleration of the air in the direction of the peripheral motion of the rotor surface. After it has been accelerated to the peripheral sepped of the rotor, the cooling air enters radial holes (13), and, whilst passing radially through the radial holes (13), undergoes a reduction in the quantity of tangential motion, Subsequently, the cooling air is released into the hollow rotor, with a correspondingly reduced outlet radius (14). A series of labyrinth seals combined with brush seals separate the chamber for combined with brush seals separate the chamber for feeding of air to the radial holes (13), from the low-pressure environment around the pad #2 (15) of the said gas turbine.

5 Claims, 2 Drawing Sheets

SYSTEM TO FEED COOLING AIR INTO A GAS TURBINE ROTOR

Figure 1:
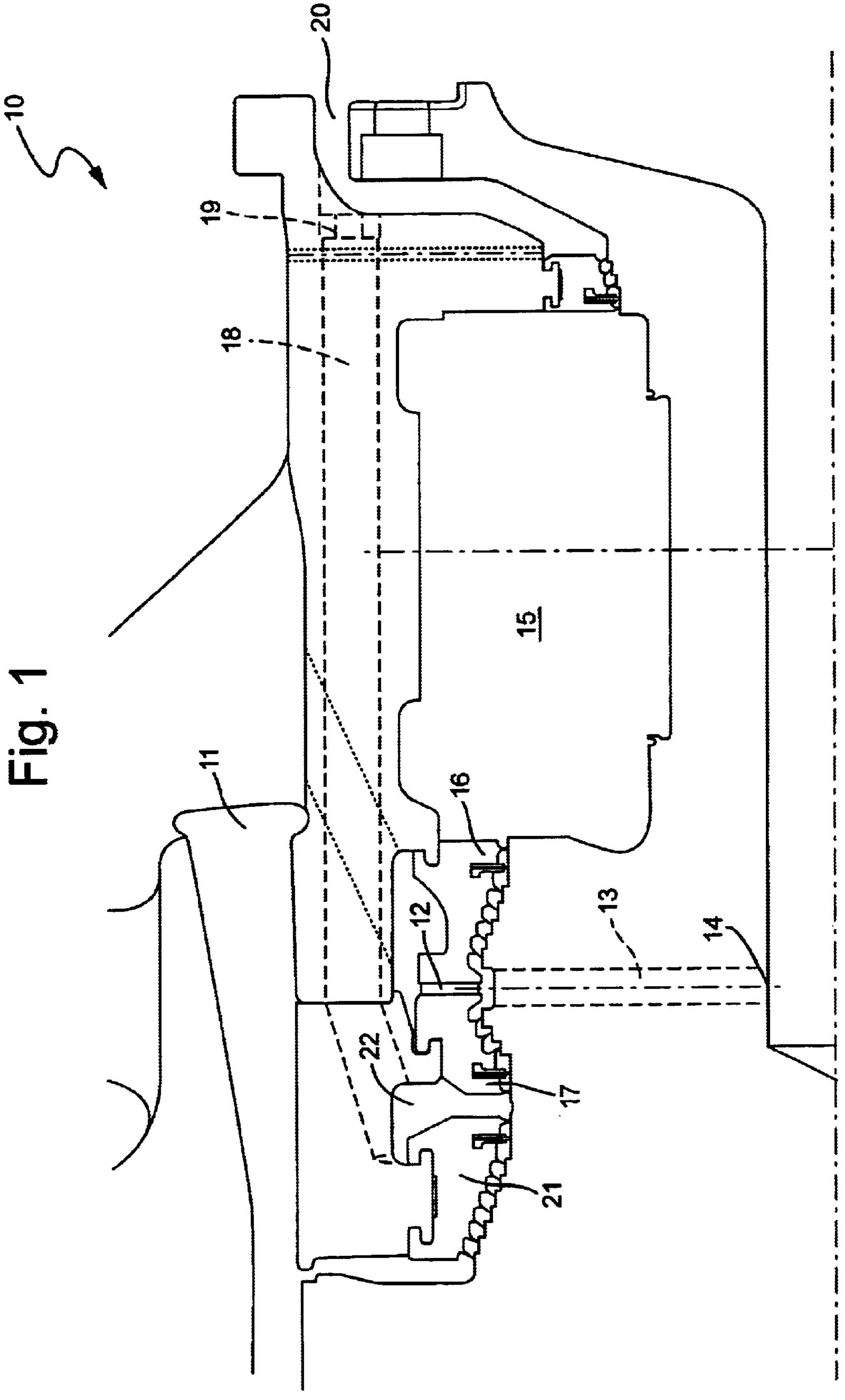

This application is the US national phase of international application PCT/EP01/14709 filed 5 Dec. 2001, which designated the US.

The present invention relates to a system to feed cooling air to a gas turbine.

As is known, gas turbines are machines which consist of a compressor and of a turbine with one or several stages, wherein these components are connected to one another by a rotary shaft, and wherein a combustion chamber is provided between the compressor and the turbine.

Air obtained from the external environment is fed to the said compressor, in order to pressurise it.

Inside the combustion chamber is admitted the fuel, which is ignited by means of corresponding spark plugs, in order to produce the combustion, which is designed to give rise to an increase in temperature and pressure, and thus of enthalpy of the gas.

Subsequently, via corresponding pipes, the high-temperature, high-pressure gas reaches the different stages of the turbine, which transforms the enthalpy of the gas into mechanical energy available to a user.

In fact, in the technological field of gas turbines, much effort has been made to improve the thermodynamic efficiency of the system, for example by making the gas turbines function at increasingly high temperatures.

In this context, in order to allow the turbines to operate at these higher temperatures of the gases, which can also be higher than those which the internal materials of the machine can normally tolerate, much effort has been made to develop efficient methods for cooling the internal materials of the gas turbines.

In particular, it is known that there are components of the gas turbine in the hot gas path, such as the turbine nozzles and rotor blades, which are exposed to very high temperatures, and require significant quantities of cooling air.

It is also known that the hollow rotor of the turbine is often used to supply the flow rate of air which is necessary for cooling of the blades.

The air which is obtained from the compressor delivery is admitted radially into the rotor.

The air then passes around the rotor circuit centrifugally, in order subsequently to rise in the interior of the circuit, until the blades are reached.

The difficulty in designing these systems is concentrated in the area of interface between the rotating shaft and the stator structure which feeds the air, and in the portion of rotor circuit which involves centripetal motion of the cooling air.

The main problems of this system are varied, and include firstly heating by friction of the air obtained from the compressor delivery.

A second problem of the known art is caused in particular by the loss of pressure, owing to the feeding of the air from the stator system to the rotor system.

A third problem relates to the leakages of air which increase the losses of performances, and the leakages of air which pollute the cooling flow to the blades.

Finally, undesirable acoustic effects are produced (which are also known as vortex whistle), caused by the air in vortical motion inside the rotor.

With reference to the state of the art, it can be noted that the first and second problems are solved by means of use of a radial stator distributor (accelerator), which, using the energy contained in the compressor delivery air, accelerates the air, in order to adapt it to the peripheral speed of the rotor area preselected for the introduction.

This expansion gives rise to a reduction in the total temperature relative to the rotor, and thus also permits reduction of the flow rate which is necessary in order to cool the blades, with obvious advantages for the efficiency of the thermodynamic cycle.

In addition, adapting the peripheral speed of the air to that of the rotor minimises the total pressure losses caused by feeding the cooling flow inside the rotor (a solution to this problem is described in U.S. Pat. No. 4,541,774).

A circumferential channel is thus created around the area of the rotor in which the radial access holes for the cooling air are provided, which area is at a lower temperature and pressure level than those of the compressor delivery.

A system with a dual seal is provided, in order to prevent the intake of air from the compressor delivery into this circumferential feed channel.

In fact, the two seals serve the purpose of creating a further low-pressure chamber, which communicates with the front rotor space of the 1st stage turbine rotor of the gas generator, i.e. downstream from the 1st stage nozzles of the gas generator.

By this means, the rotor space is also purged by the air which leaks from the two seals.

A third seal separates the channel from a lower pressure area, i.e. that which is around the pad #2, or that which is downstream from the first stage nozzles of the gas generator, and must limit the leakages which affect the performance.

The sealing system uses a mixed configuration of labyrinth seals combined with brush seals, which increase the efficiency of controlling the leakages.

Finally, the radial holes provided in the rotor have the task of imposing a forced vortex on the centripetal motion of the air, and which extends as far as a corresponding radius suitable for preventing the formation of vortex whistle inside the rotor cavities (Radial Hole Deswirler).

The object of the present invention is thus to provide a system to feed cooling air to a gas turbine, which operates such that the above-described requirements are met.

Another object of the invention is to provide a system to feed cooling air to a gas turbine, which can prevent heating by friction of the air obtained from the compressor delivery.

Another object of the invention is to provide a system to feed cooling air in a turbine, which prevents pressure losses caused by feeding the air from the stator system to the rotor system.

A further object of the invention is to provide a system to feed cooling air to a gas turbine, which makes it possible to reduce as far as possible the air leakages which increase the losses of performance, and the air leakages which pollute the cooling flow to the blades.

An additional object of the invention consists of providing a system to feed cooling air to a gas turbine, which can prevent the air which is in motion inside the rotor from producing undesirable acoustic effects.

These objects and others according to the invention are achieved by a system to feed cooling air to a gas turbine, wherein the cooling air is obtained from a high-pressure source, inside the said gas turbine, and is conveyed to radial accelerators which give rise to tangential acceleration of the air in the direction of the peripheral motion of the rotor surface, characterised in that, after the said cooling air has been accelerated substantially to the peripheral speed of the rotor, it enters radial holes, and, whilst passing radially through the said radial holes, undergoes a reduction of quantity of tangential motion by means of the law of forced vortex, and subsequently the said cooling air is released in the hollow rotor, with a correspondingly reduced outlet radius.

In particular, a series of labyrinth seals, combined with brush seals, separate the chamber for feeding the air to the radial holes, from the low-pressure environment around the pad #2 of the said gas turbine.

In addition, after the cooling air has been accelerated to the peripheral speed of the rotor, it enters the radial holes with minimal total pressure losses, and at a reduced relative total temperature.

Further characteristics of the present invention are defined in the other claims attached to the present application.

Figure 2:
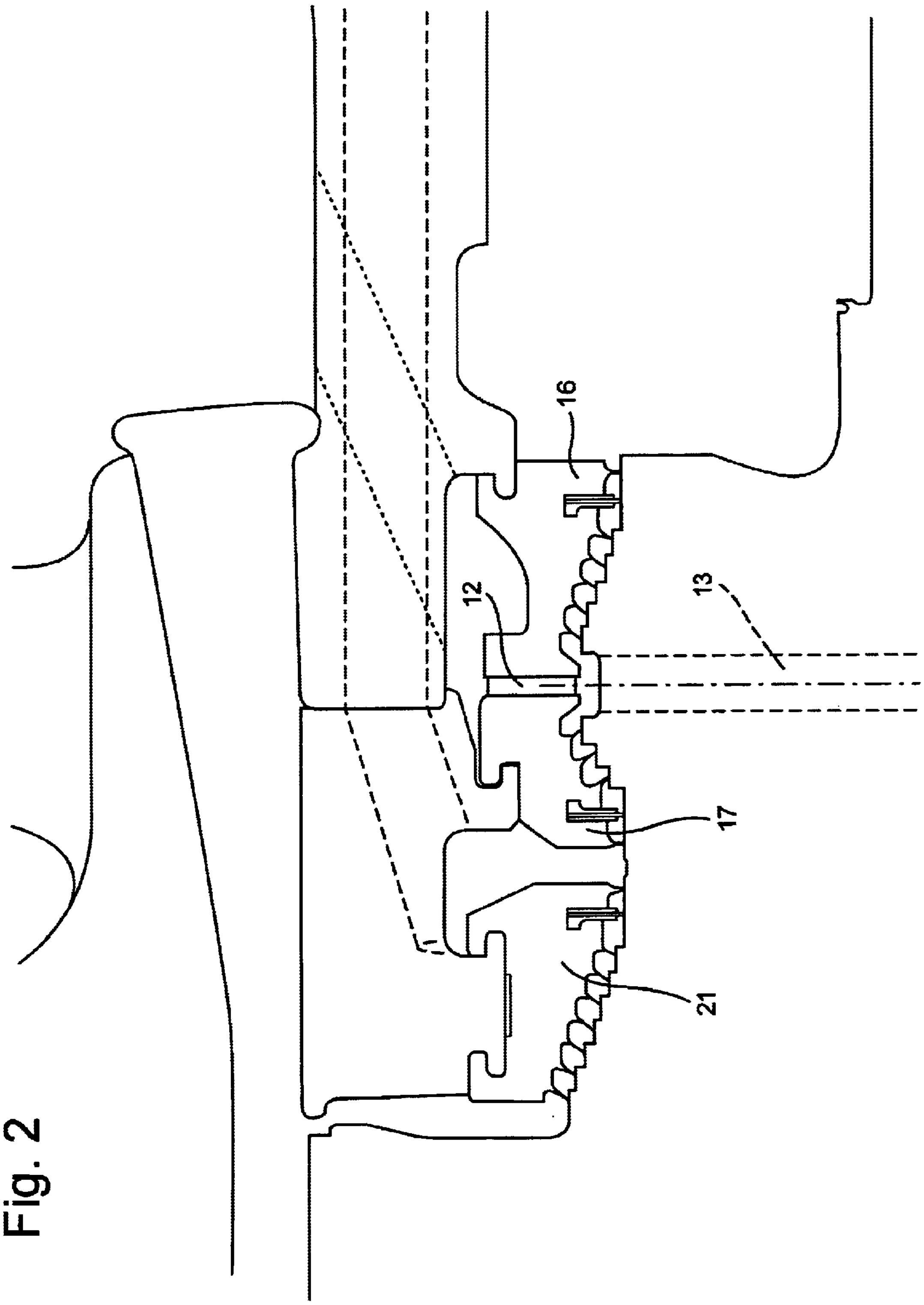

The characteristics and advantages of the system to feed cooling air to a gas turbine, according to the present invention, will become more apparent from the following description of a typical embodiment, provided by way of non-limiting example with reference to the attached schematic drawings, in which:

FIG. 1 represent a schematic view in cross-section of the system to feed cooling air to a gas turbine, according to the present invention; and FIG. 2 represent in cross-section a detail of the area of intake of air into the rotor, according to the present invention.

With particular reference to the aforementioned figures, a description is now provided of the structure and functioning of the system according to the present invention, which is indicated globally by the reference number 10.

The cooling air is obtained from a high-pressure source inside the turbine engine.

In the case in question, the cooling air is obtained from the inner surface of the discharge diffuser 11 of the axial compressor of the gas turbine.

From there, the cooling air is conveyed to the radial accelerators 12, which give rise to the tangential acceleration of the air in the same direction as the peripheral motion of the opposite rotor surface.

After the air has been accelerated to the peripheral speed of the rotor, it enters the radial holes 13 with minimal total pressure losses and at a reduced relative total temperature.

Whilst passing radially through the radial holes 13, the quantity of tangential motion of the cooling air is reduced by means of the law of forced vortex (otherwise known as Radial Hole Deswirler).

The cooling air is released in the hollow rotor with a correspondingly reduced outlet radius 14, in order to prevent the possibility of establishment of the aforementioned phenomenon of vortex whistle, which is associated with the high tangential outlet Mach.

The labyrinth seal, combined with a brush seal 16, separates the chamber for feeding the air to the radial holes, from the low-pressure environment around the pad #2, indicated by the reference number 15.

This leakage is minimised by use of a labyrinth series seal, combined with a brush seal, wherein the brush seal is downstream from the labyrinth seal, in order to improve the overall efficiency of the system.

A labyrinth seal combined with a brush seal 17 separates the chamber to feed the air to the radial holes 13, from the chamber which communicates with the first rotor space 20, by means of corresponding channels 18 and calibration apertures 19.

The leakage flow rate is controlled by means of use of a labyrinth series seal combined with a brush seal, wherein the brush seal is downstream from the labyrinth seal, in order to improve the efficiency of the system.

This leakage forms part of the purge flow rate for the first rotor space 20.

The labyrinth seal combined with a brush seal 21 separates the delivery of the compressor, from the chamber 22 which communicates with the first rotor space, by means of corresponding channels 18 and calibration apertures 19.

The description provided makes apparent the characteristics and advantages of the system according to the present invention, to feed cooling air to a gas turbine.

The following concluding points and comments are now made, in order to define the said advantages more clearly and accurately.

Firstly, the system according to the invention is a dual seal system, with an intermediate chamber, which prevents mixing of the leakage flow rate from the axial compressor, with the cooling flow rate of the accelerators (advantages for cooling of the blades), and permits readmission into the channel, of the leakages from the compressor delivery and from the accelerator system, a fact which provides considerable benefits in the efficiency of the thermodynamic cycle.

In addition, it includes a simple deswirl system, obtained by means of radial holes in the compressor shaft, thus eliminating the need for costly processing operations and complicated design solutions for production of a profiled deswirler.

Finally, the system is a sealing system with labyrinth seals and brush seals, which permits a high level of retention of the leakage flow rate, a fact which provides considerable benefits for the thermodynamic cycle.

The theoretical and experimental results have been so satisfactory that the system can be used for new gas turbines.

Finally, it is apparent that many variations can be made to the system which is the subject of the present invention, to feed tooling air to a gas turbine, without departing from the principles of novelty inherent in the inventive concept.

It is also apparent that, in the practical embodiment of the invention, any materials, dimensions and forms can be used, according to requirements, and can be replaced by others which are technically equivalent.

The scope of the present invention is defined in the attached claims.

What is claimed:

1. System to feed cooling air to a gas turbine, wherein the cooling air is taken from a high-pressure source, inside the said gas turbine, and is conveyed to radial accelerators (12), which give rise to the tangential acceleration of the air in the direction of the peripheral motion of the rotor surface, after it has been accelerated to the peripheral speed of the rotor, the said cooling air enters radial holes (13), and whilst passing radially through the said radial holes (13), undergoes a reduction in the quantity of tangential motion, by means of the law of forced vortex, and, subsequently, the said cooling air is released into the hollow rotor, with a correspondingly reduced outlet radius (14), characterised in that it comprises a labyrinth seal combined with a brush seal (17) to separate the chamber to feed the air to the radial holes (13), from the chamber which communicates with the first rotor space in a way to form an intermediate chamber which prevents mixing of the leakage flow rate from the axial compressor, with the cooling flow of the accelerators.

2. System to feed cooling air according to claim 1, characterised in that a series of labyrinth seals combined with brush seals separate the chamber for feeding of air to the radial holes (13), from the low pressure environment around the pad #2 (15) of the said gas turbine.

3. System to feed cooling air according to claim 1, characterised in that it comprises a labyrinth seal combined with a brush seal (21) to separate the compressor delivery from the chamber (22) which communicates with the first rotor space (20).

4. System to feed cooling air according to claim 1, characterised in that the leakage flow rate is controlled by means of use of the said labyrinth seals combined with brush seals, wherein the brush seal is downstream from the labyrinth seal, in order to improve the overall efficiency of the said system.

5. System to feed cooling air according to claim 1, characterised in that the said cooling air is obtained from the inner surface of the discharge diffuser (11) of the axial compressor.

* * * * *

UNITED STATES PATENT AND TRADEMARK OFFICE

CERTIFICATE OF CORRECTION

PATENT NO. : 6,923,005 B2
APPLICATION NO. : 10/450263
DATED : August 2, 2005
INVENTOR(S) : Casoni, A.

It is certified that error appears in the above-identified patent and that said Letters Patent is hereby corrected as shown below:

on the title page item (57), in the Abstract:

Line 3, delete “turgine,” and insert --turbine,--

Line 3, delete “(129” and insert --(12)--

Line 6, delete “sepped” and insert --speed--

Line 9, delete “motion,” and insert --motion.--

Line 13, delete second occurrence of “combined with brush seals separate the chamber for”

Signed and Sealed this

Fifteenth Day of August, 2006

JON W. DUDAS
*Director of the United States Patent and Trademark Office*